United States Patent [19]

Weetall

[11] Patent Number: 4,479,970

[45] Date of Patent: Oct. 30, 1984

[54] PROCESS FOR REMOVING NATURAL COLORANTS FROM WINE

[75] Inventor: Howard H. Weetall, Big Flats, N.Y.

[73] Assignee: Corning Glass Works, Corning, N.Y.

[21] Appl. No.: 485,477

[22] Filed: Apr. 15, 1983

[51] Int. Cl.³ .................... A23B 7/00; C12G 1/00; C12G 1/02

[52] U.S. Cl. .................... 426/253; 426/256; 426/330.4

[58] Field of Search .......... 426/253, 256, 330.4, 426/423

[56] References Cited

U.S. PATENT DOCUMENTS

| | | | |
|---|---|---|---|
| 2,471,474 | 5/1949 | Alba et al. | 426/330.4 |
| 2,873,192 | 2/1959 | Walles et al. | 426/330.4 |
| 3,086,865 | 4/1963 | Walles et al. | 426/330.4 |
| 4,027,046 | 5/1977 | Bohm et al. | 426/330.4 |
| 4,166,141 | 8/1979 | Westermann et al. | 426/330.4 |
| 4,288,462 | 9/1981 | Hou | 426/330.4 |

*Primary Examiner*—Jeanette M. Hunter
*Attorney, Agent, or Firm*—B. D. Voyce; W. E. Maycock

[57] ABSTRACT

A process for reducing the color of a wine by
 immobilizing gelatin to form an insoluble composite and
 contacting a fluid selected from wine, grape juice, and grape must with the immobilized gelatin composite; and
separating the fluid from the insoluble composite.

5 Claims, No Drawings

PROCESS FOR REMOVING NATURAL COLORANTS FROM WINE

TECHNICAL FIELD

The present invention relates to a method for removing colorants from wine. More particularly, an immobilized gelatin composite is used to remove anthocyanin pigments from wine.

RELATED APPLICATION

Concurrently filed with the present application is a related disclosure by the same inventor, PROCESS AND COMPOSITIONS FOR REMOVING TANNINS FROM WINE, Ser. No. 485,478 filed Apr. 15, 1983. The specification of the related application is to be incorporated into the present specification by this reference.

BACKGROUND ART

From the deep reds of a cabernet to the light pinks of a rosé, wine color is due to a group of compounds known as anthocyanins. Naturally present in wine grapes, anthocyanins are found primarily in the grape skin, and to a lesser extent, in the pulp of the grape. The depth or intensity of the color of a wine is based on the amount of color in the pulp plus the time that the skins are in contact with the pulp after being crushed into a grape must. For example, the pulp of the Pinot Noir grape has a pink color, but when the skins are present during fermentation, a deep red color is imparted.

Normally, changing the color of a wine is of little interest to a vintner. However, today the popularity of white wines exceeds the capacity of the vineyards to grow traditional white wine grapes. Thus, the ability to remove color from grapes and enable "red wine grapes" to produce white wines is significant.

DISCLOSURE OF THE INVENTION

In accordance with the present invention, an immobilized gelatin composite is used in a process for removing the natural colorants of a wine. The composite is made by immobilizing gelatin, i.e., making it insoluble in wine. Thereafter, a wine having natural colorants is contacted with the composite for a time sufficient to remove the desired amount of colorants. The wine separated from the insoluble composite has a reduced colorant level, and hence, a lighter, less intense color.

Gelatin, as defined by those of skill in the art includes those albuminous proteins found in plant and animal tissue which are capable of forming a gel in water. Any compound fitting this description is suitable for the present invention.

BEST MODE OF CARRYING OUT THE INVENTION

In a preferred embodiment, the immobilized gelatin composite is formed by obtaining 100 grams of porous silica with 0.5% silane (Corning Biosystems), adding it to 200 ml of 0.1M, ph 7.0 phosphate buffer having 10% glutaraldehyde (volume/volume), and incubating the mixture at ambient temperature for two hours. After being filtered and water washed, the derivitized silica is added to 600 ml of similar phosphate buffer containing 2% gelatin (weight/weight).

The gelatin and porous silica are agitated for over 8 hours at ph 7.0 and room temperature. The resulting immobilized gelatin composite is thoroughly water washed, acetone dried, and packed into a column. Wine having natural colorants is passed through the column at a flow rate sufficient to allow removal of the colorants.

The following examples demonstrate the performance of the present method:

EXAMPLE 1

Increasing amounts of dried composite, produced as described above, were added to separate 100 ml aliquots of Rosé wine. The aliquot mixtures were shaken overnight before the composites were separated from the wine. The change in absorption at 550 mm was recorded spectrophotometrically for each aliquot.

The results were:

| Composite Weight/ 100 ml Wine (g) | $\Delta A_{550}$ | % Color loss |
| --- | --- | --- |
| 0 (control) | 0.47 | — |
| 0.1 | 0.43 | 11 |
| 0.5 | 0.31 | 34 |
| 1.0 | 0.24 | 50 |
| 5.0 | 0.13 | 70 |

A significant color loss is achieved.

EXAMPLE 2

A second composite preparation of cross-linked gelatin different from that of Example 1, was prepared. A 500 ml, 10% (weight/weight) K and K type 2991 gelatin in warm water solution was made. This was added to 50 ml of 25% glutaraldehyde (volume/volume). The resulting, still warm mixture was quickly added to 500 ml of toluene. The gelatin-toulene mix was blended at medium speed in a Waring blender for about 3 minutes. During this action, the gelatin became very congested and spongy in appearance. After blending, the gelatin was poured into a beaker containing 500 ml of acetone. Because the material did not appear to easily break up, the solvent was poured into another beaker and the gelatin squeezed through a 50 ml syringe (no needle) into the decanted solvent. This was allowed to stand 10 minutes and decanted. Acetone was re-added and then decanted 3X. The final wash was allowed to stand in acetone for one hour, decanted and air dried.

Test for Color Removal

About 125 ml of Gallo Rosé Wine was poured into a flask to which 1.0 g of the dried gelatin was added. This was corked along with a control sample receiving no gelatin. Data was read spectrophotometrically at 550 nm. Samples were filtered through No. 41 Whatman paper.

| Time | Control | Results Composite | % Color Removed |
| --- | --- | --- | --- |
| 11 min | 0.28 | 0.28 | 0 |
| 1 hr 5 min | 0.29 | 0.14 | 52 |
| 2 hrs | 0.29 | 0.09 | 69 |
| 18 hrs | 0.30 | 0.06 | 80 |

Example 3

A second 50 g batch of gelatin was immobilized as previously described in Example 2. Samples, previously dried in acetone, were placed in 250 ml flasks to which 100 ml of Rosé Wine was added. The flasks were gently stirred and assayed for color removal after 2 hrs, 4 hrs, and 18 hrs.

For assay purposes, the wine was first filtered through S&S No. 576 filter paper and read spectrophotometrically at 550 nm.

| Sample Gelatin Added (g) | Time $\Delta A_{550}$ | | |
|---|---|---|---|
| | % Removal - 2hr | % Removal - 4hr | % Removal - 18hr |
| 0 (control) | 0.24–0 | 0.24–0 | 0.22–0 |
| 0.1 g | 0.16–33 | 0.15–37 | 0.14–36 |
| 0.25 g | 0.12–50 | 0.11–54 | 0.10–55 |
| 0.50 g | 0.09–64 | 0.08–67 | 0.06–73 |
| 0.75 g | 0.07–71 | 0.06–75 | 0.05–77 |
| 1.00 g | 0.06–75 | 0.05–79 | 0.04–82 |

EXAMPLE 4

The gelatin composite of Example 1 was compared to derivitized silica without gelatin. Gelatin composite and silica carrier were added to Gallo Vin Rosé wine aliquots in increasing amounts. The mixtures were shaken at room temperature, samples being taken at 2 and 4 hours.

| Amount of Composite/ Carrier | $\Delta A_{550\ mm}$ | | | |
|---|---|---|---|---|
| | Two Hour Exposure | | Four Hour Exposure | |
| | G | S | G | S |
| 0 | 0.250 | 0.250 | 0.245 | 0.245 |
| 0.1 | 0.240 | 0.250 | 0.240 | 0.245 |
| 0.5 | 0.220 | 0.265 | 0.245 | 0.285*c |
| 1.0 | 0.205 | 0.295c | 0.195 | 0.345*c |
| 5.0 | 0.135 | 0.470c | 0.130 | 0.765*c |

G = gelatin composite
S = silica carrier
c = cloudy
*When cloudiness developed after 4 hours, the samples were filtered using No. 576 filter paper. The new

| results were: | 0 | 0.200 |
|---|---|---|
| | 0.1 | 0.200 |
| | 0.5 | 0.200 |
| | 1.0 | 0.200 |
| | 5.0 | 0.250 |

Alternative embodiments include the use of equivalent insoluble ceramic carriers such as alumina, titiania, and zirconia. Attachment of gelatin would be performed by conventional crosslinking, covalent bonding, and adsorptive methods known to those of skill in the art.

A different set of embodiments envisions the immobilizing of gelatin by polymerizing it so as to form a insoluble polymer has been demonstrated in Examples 2 and 3. Other conventional techniques are known to the art, e.g., cross-linking with glutaraldehyde, ethyl chloroformate, o-dianisidine, and other bifunctional or multifunctional agents.

Having described the invention with particular reference to preferred embodiments, it will be obvious to those skilled in the art to which the invention pertains, that, after understanding the invention, various changes and modifications may be made without departing from the spirit and scope of the invention as defined by the appended claims.

I claim:

1. A process for reducing the color of a wine comprising:
    (a) immobilizing gelatin to form an insoluble composite;
    (b) contacting wine or a wine precursor fluid selected from grape juice or grape must with the immobilized gelatin composite; and
    (c) separating the fluid from the insoluble composite.

2. The process recited in claim 1 wherein gelatin is immobilized by attachment to an insoluble carrier.

3. The process recited in claim 2 wherein the gelatin is covalently bonded to an insoluble carrier.

4. The process recited in claim 1 wherein the gelatin is polymerized into an insoluble composite.

5. The process recited in claim 4 wherein the gelatin is polymerized by cross-linking gelatin with glutaraldehyde.

* * * * *